Patented Mar. 12, 1935

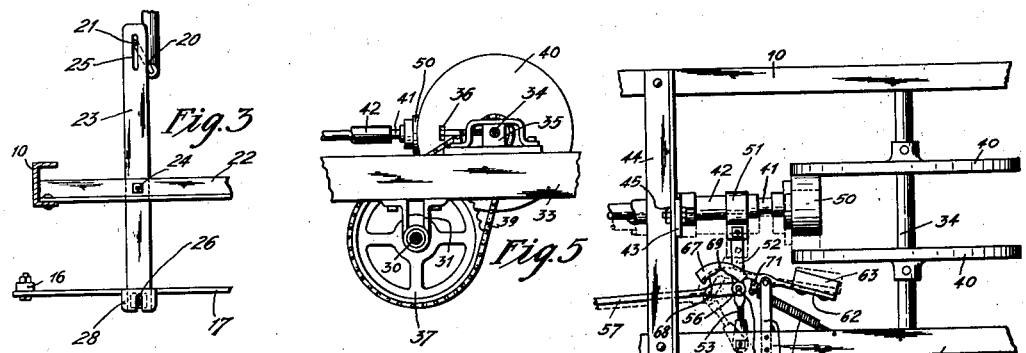

1,994,005

UNITED STATES PATENT OFFICE 1,994,005

MINIATURE AUTOMOBILE

Ezra G. Plummer and Donald E. Plummer, Altoona, Iowa

Application July 11, 1932, Serial No. 621,872

5 Claims. (Cl. 180—1)

Our invention relates to improvements in miniature automobiles designed to be operated by children, and which is propelled by a small internal combustion engine.

The object of our invention is to provide a self propelled miniature automobile which is of simple and cheap construction, and which at the same time may be easily and safely operated by a child.

A further object is to provide a self propelled miniature automobile having the steering and driving mechanism so arranged in the automobile body as to take up a small amount of space, and at the same time have the body so constructed that it will have the appearance of a sport or racer type automobile.

A further object is to provide in a miniature automobile improved and simple mechanism for operating the steering gear of the automobile.

A further object is to provide in a miniature automobile improved transmission gear mechanism for transmitting power from the engine to the traction wheels and braking mechanism whereby a single lever may be utilized for controlling both the transmission gears and the braking operation.

Our invention consists in the construction, arrangement and combination of the various parts of the device, whereby the objects contemplated are attained, as hereinafter more fully set forth, pointed out in our claims, and illustrated in the accompanying drawing, in which:

Figure 1 is a side elevation of our improved miniature automobile, a portion of the body being broken away.

Figure 2 is a bottom view of same.

Figure 3 is a detail sectional view taken on the line 3—3 of Figure 1.

Figure 4 is an enlarged top view of the transmission and braking mechanism.

Figure 5 illustrates a segmental portion of the main frame and the manner in which the chain of the power transmitting mechanism is tightened.

Referring to the accompanying drawing, we have used the reference numeral 10 to indicate the side members of the main frame. The forward end of the frame is provided with a body portion 11 having an imitation radiator 12 at its forward end. At the front end of the frame 10 is supported an axle 13 to which steering spindles 14 are pivotally connected. Said spindles support the steering wheels 15. The spindles 14 have rearwardly extending links 16 to which a drag link 17 is pivotally connected.

A steering shaft 18 is carried by the body 11, the rear end of which is provided with a hand wheel 19, while the forward end of the shaft 18 terminates in a crank 20 having a wrist pin 21. Said crank 20 is supported in a vertical plane when the steering gear is adjusted for straight forward movement.

The frame members 10 are provided with a transversely arranged angle iron 22 to which a vertically arranged lever 23 is pivotally connected by means of a suitable bolt or rivet 24. The upper end of said lever 23 has a vertically arranged slot 25 for receiving the wrist pin 21 of the crank 20. The lower end of the lever 23 is also provided with a slot 26 for receiving a bolt 27 secured to the drag link 17 by means of a bracket 28. The shaft 18 is preferably mounted in a pipe or tube 29 secured by suitable means to the body.

Thus it will be seen that rotation of the wheel 19 will cause the crank 20 to be rocked by the shaft 18, which in turn will cause the free end of the lever 23 to be oscillated. The lower end of said lever causes the drag link 17 to be moved transversely and steering operation imparted to the wheels 15.

By this arrangement it will be seen that as the wheel 19 is operated from its normal position in either direction, steering movement may be imparted to the automobile in either direction by a 90° movement of the steering wheel, and that the first part of said movement will impart rapid steering action to the steering wheels which will gradually decrease until the crank 20 has reached dead center position, or has moved through an angle of approximately 90°. Thus means is provided whereby rapid steering action may be imparted to the automobile during the first steering movement which we find to be very desirable in the operation of miniature automobiles.

The rear end of the frame 10 is supported by an axle 30 carried by suitable bearings 31 secured to the under side of the frame members 10. The axle 30 is carried by traction wheels 32, one of said wheels being fixed to the axle, and the other being mounted to rotate freely thereon.

Supported on the rearwardly extending portion 33 of the frame we have provided a countershaft 34 mounted in adjustable bearings 35 carried by the frame members 33. Said bearings 34 are adjusted by means of set screws 36. The axle 30 is provided with a sprocket wheel 37, while the shaft 34 is provided with a sprocket pinion 38. Said sprockets support a chain 39 by means of which power is transmitted from the counter-shaft 34 to the axle 30. The adjustable bearings 35 provide means for taking up wear in the chain. The counter-shaft 34 is provided with a pair of spaced disks 40 fixed thereto.

For imparting motion to the said disks 40 we have provided a torsional shaft 41 mounted in a sleeve or tube 42, said sleeve being supported by a suitable bracket 43 pivotally connected to a transversely arranged frame member 44 by means of a bolt 45. The body of said sleeve is supported above the floor member 46 of the automobile body 11. The forward end of the shaft 41 is connected to the power shaft 47 of the internal combustion engine 48 by means of a universal joint 49. The engine 48 is preferably of the one cylinder four cycle type and forms no part of my present invention, other than to provide power means for operating the transmission gear device.

The rear end of the shaft 41 is provided with a friction wheel 50 preferably formed of hard rubber, said wheel being of a diameter slightly less than the space between the friction plates 40, said wheel being mounted between said plates, in the manner clearly illustrated in Figure 2, and disengages both of said plates in its neutral or inoperative position.

The rear end of the sleeve 42 is provided with a collar 51 to which a link 52 is pivotally connected. The free end of said link is pivotally connected to an adjustable link 53, one end of which is pivotally connected to one of the frame members 10 by a pivot member 54. The links 52 and 53 are connected by a pivot 55, one end of which extends downwardly to support a roller 56. Connected to the pivot 55 we have provided a link 57, one end of which is pivotally connected to the lower end of an operating lever 58 pivotally connected to a suitable bracket 59 secured to the floor board 46 of the body. Said bracket has a sector 60 for locking the lever in its neutral or operative positions.

The parts are so arranged that when the lever 58 is in a vertical position, as shown in Figure 1, the links 52 and 53 will be supported in the position shown in Figure 2. If the upper end of the lever 58 is moved forwardly, then its lower end will be moved rearwardly, causing the links 52 to be straightened to a dead center position, which in turn will cause the rear end of the sleeve 42 to be moved laterally and the friction wheel 50 to engage one of the friction disks 40, thereby causing power to be transmitted from the shaft 41 to the disk 40, and from there to the axle 30 by means of the chain 39 and the sprockets 37 and 38.

Thus it will be seen that means is provided for locking the gear mechanism in condition for advancing the automobile forwardly. By moving the upper end of the lever 58 rearwardly, the pivot member 55 will be moved forwardly, causing the friction wheel 50 to engage the opposite disk 40 and reverse movement imparted to the automobile.

In this connection it should be observed that forward movement of the lever 58 will cause the automobile to be moved forwardly, and rearward movement of said lever to cause the automobile to be moved rearwardly, thereby providing a simple control which may be easily learned by an operator.

When the lever 58 is in its vertical or neutral position, the friction wheel 50 will be out of engagement with both of the disks 40, at which time no power is applied to the said friction wheels. The engine 48 is provided with an automatic governor whereby excessive speeds will be impossible.

By pivoting the bracket 43 to the frame member 44, means is provided whereby the rear end of the sleeve 42 will be permitted to swing freely to permit engagement of the wheel 50 with the disks 40.

Secured to one of the frame members 10 we have provided a bracket 61 to which a lever 62 is pivotally connected. One end of the lever 62 is provided with a brake shoe 63, designed to engage the outer surface of one of the disks 40. Said brake shoe is also supported by a vertically arranged link 64 having its upper end secured to the back member 65 of the operator's seat 66.

The forward end of the lever 62 is provided with a cam plate 67 having one edge provided with a concave surface 68, the central portion of which is provided with a notch 69 for receiving the roller 56 when the links 52 and 53 are in their neutral position, and at which time the brake shoe 63 is caused to engage the outer face of the disk 40. Said shoe is yieldably and quite firmly retained in contact therewith by means of a spring 70, one end of which is connected to the frame member 33 and the other to a laterally extending arm 71 forming a part of the lever 62.

The cam plate 67 is so arranged that if the pivot member 55 is moved either forwardly or rearwardly, the roller 56 will cause the forward end of the lever 65 to move inwardly by climbing out of the notch 69, so that the shoe 63 will be moved out of engagement with the disk 40 against the action of the spring 70, thereby providing very simple brake applying means arranged to apply the brake at the time the roller 50 is in its neutral position. Both the brake shoe 63 and the roller 50 are moved to operative or inoperative position by means of a single control lever 58.

The counter-shaft 34 and the disk 40 are mounted in the rear end of the body back of the seat 66 and back of the axle 30. By this arrangement the disks are supported in the rear end of the body and are entirely hidden from view when the automobile is in operation. All the transmitting gear mechanism is positioned close to the rear axle and in such manner that the entire weight of the transmission gear is carried by said rear axle.

The rear end of the body is provided with an extra wheel 72.

Thus it will be seen that we have provided a comparatively simple miniature automobile of simple and cheap construction having simple and easily operated control device which may be easily and quickly operated by a child, and at the same time provide an automobile which it self propelled and reliable and comparatively safe in its operation.

We claim as our invention:

1. A miniature automobile comprising a supporting frame, an engine carried thereby, an axle, traction wheels supporting said axle, one being permanently connected thereto, a counter-shaft, means for operatively connecting said axle to said counter-shaft, a pair of spaced disks carried by said counter-shaft, a friction roller between said disk and of slightly smaller diameter than the spacing of the inner faces of said disks, a torsional shaft having one end supporting said roller and the opposite end connected to said engine, a bracket pivoted to said supporting frame for supporting the rear end of said torsional shaft to permit said roller to be moved into contact with either of said disks, a link pivotally connected to the rear end of said torsional shaft, an adjustable link pivotally connected to the free end of the first link, said adjustable link having one end pivotally connected to said frame, a pivot member for connecting said links, a third link connected to the last pivot member, a lever for operating said third link to move the first said links laterally, a brake shoe designed to engage one of said disks, a lever for supporting said brake shoe, means for pivoting said lever to said frame, the free end of said lever having a cam designed to engage the pivot member of the first said links, said cam being so shaped that the brake shoe will be set when the roller is in its neutral position and will be disengaged when the roller is in contact with either of said disks.

2. A miniature automobile comprising a supporting frame, an axle, a counter-shaft, means operatively connecting said axle to said counter-shaft, a pair of spaced disks carried by said counter-shaft, a friction wheel between said disks and of smaller diameter than the spacing between the disks, a driving shaft having one end connected to said wheel, means for mounting the rear end of said drive shaft to move laterally, hand actuated means operatively connected to the rear end of said drive shaft for moving the wheel into and out of engagement with said disks, said means including a movable roller, a brake shoe designed to engage one of said disks, a lever for supporting said brake shoe, means for pivoting said lever to said frame, the free end of said lever having a cam designed to engage said roller, said cam being so shaped that the brake shoe will be set when the wheel is in its neutral position and will be disengaged when the wheel is in contact with either of said disks.

3. A miniature automobile comprising a supporting frame, an axle, a counter-shaft, means operatively connecting said axle to said counter-shaft, a pair of spaced disks carried by said counter-shaft, a friction roller between said disks and of smaller diameter than the spacing between the disks, a drive shaft having one end connected to said roller, means for mounting the rear end of said drive shaft to move laterally, a link pivotally connected to the rear end of said drive shaft, an adjustable link pivotally connected to the free end of the first link, said adjustable link having one end pivotally connected to said frame, a pivot member for connecting said links, a third link connected to the last pivot member, a lever for operating said third link to move the first said links laterally, a brake shoe designed to engage one of said disks, a lever for supporting said brake shoe, means for pivoting said lever to said frame, the free end of said lever having a cam designed to engage the pivot member of the first said links, said cam being so shaped that the brake shoe will be set when the roller is in its neutral position and will be disengaged when the roller is in contact with either of said disks.

4. A miniature automobile comprising a supporting frame, an axle, a drive shaft, means for operatively connecting the drive shaft to said axle, said operating means including a movable element connected to said drive shaft for imparting forward movement to said axle, when in one position of its movement, and for imparting movement to said axle in the opposite direction when in the other position of its movement, and for imparting no movement to the axle when the element is in a third or neutral position of its movement; means for actuating said movable element including a cam engaging member, brake mechanism including a movable shoe, a cam adapted to be actuated by said cam engaging member, means operatively connecting said cam to said brake shoe, the cam being so shaped that the brake will be set when the movable element is in its neutral position and will be disengaged when the movable element is in either of its operative positions.

5. A miniature automobile comprising a supporting frame, an axle, a drive shaft, means for operatively connecting the drive shaft to said axle, said operating means including a movable element connected to said drive shaft adapted to be moved from a neutral position to a number of other operative positions; means for actuating said movable element including a cam engaging member, brake mechanism including a movable shoe, a cam adapted to be actuated by said cam engaging member, means operatively connecting said cam to said brake shoe, the cam being so shaped that the brake will be set when the movable element is in its neutral position and will be disengaged when the movable element is in either of its operative positions.

EZRA G. PLUMMER.
DONALD E. PLUMMER.